United States Patent
Candido et al.

(10) Patent No.: US 11,015,935 B2
(45) Date of Patent: May 25, 2021

(54) WIND DATA BASED FLIGHT MAPS FOR AIRCRAFT

(71) Applicant: LOON LLC, Mountain View, CA (US)

(72) Inventors: Salvatore J. Candido, Mountain View, CA (US); Jun Gong, Mountain View, CA (US); Jacob Buswell Roberts, San Francisco, CA (US); Vincent Carroll, Mountain View, CA (US)

(73) Assignee: LOON LLC, Mountain View, CA (US)

( * ) Notice: Subject to any disclaimer, the term of this patent is extended or adjusted under 35 U.S.C. 154(b) by 150 days.

(21) Appl. No.: 16/222,309

(22) Filed: Dec. 17, 2018

(65) Prior Publication Data

US 2020/0191572 A1    Jun. 18, 2020

(51) Int. Cl.

| G01C 21/00 | (2006.01) |
|---|---|
| G01C 21/20 | (2006.01) |
| B64C 39/02 | (2006.01) |
| H04L 29/08 | (2006.01) |
| G06N 3/08 | (2006.01) |

(52) U.S. Cl.
CPC .......... *G01C 21/005* (2013.01); *B64C 39/024* (2013.01); *G01C 21/20* (2013.01); *B64C 2201/122* (2013.01); *G06N 3/08* (2013.01); *H04L 67/12* (2013.01)

(58) Field of Classification Search
USPC ......................................................... 701/422
See application file for complete search history.

(56) References Cited

U.S. PATENT DOCUMENTS

| 8,781,727 B1 * | 7/2014 | Bonawitz ............... G05D 1/104 |
| | | 701/422 |
| 8,862,403 B1 * | 10/2014 | Piponi .................... G01C 21/20 |
| | | 701/533 |
| 9,195,938 B1 | 11/2015 | Bonawitz et al. |
| 9,635,706 B1 * | 4/2017 | Bonawitz .............. H04W 84/18 |

(Continued)

FOREIGN PATENT DOCUMENTS

EP      3339855 A1    6/2018

OTHER PUBLICATIONS

Abbeel, "Markov Decision Processes and Exact Solution Methods" UC Berkeley EECS https://people.eecs.berkeley.edu/~pabbeel/cs287-fa12/slides/mdps-exact-methods.pdf.

Musso et al., A Balloon Trajectory Prediction System, Retrieved from internet: <http://citeseerx.ist.psu.edu/viewdoc/download?doi=10.1.1.556.3766&rep=rep1&type=pdf>, 6 pages.

(Continued)

*Primary Examiner* — Tyler D Paige
(74) *Attorney, Agent, or Firm* — Marton Ribera Schumann & Chang LLP; Chien-Ju Alice Chuang; Hector J. Ribera

(57) ABSTRACT

The technology relates to generating a flight map for an aircraft. For instance, this may include, running a plurality of simulations by placing a simulated aircraft within each cell of a grid representing areas of the earth and using predicted wind data. Each simulations identifies a cell in which each aircraft is located at the end of the simulation. A connection graph may be generated using any identified cells. The connection graph may be used to determine a flight map for an actual aircraft using a cost function and iterating from a destination cell to an initial cell. The flight map may be used to determine a route for the actual aircraft. In some examples, the flight map may be refined by running further simulations. The refined flight map may then be used to determine a route for the actual aircraft.

29 Claims, 10 Drawing Sheets

(56) References Cited

U.S. PATENT DOCUMENTS

| | | | |
|---|---|---|---|
| 9,832,705 B1* | 11/2017 | Newton | H04W 28/021 |
| 10,023,323 B1* | 7/2018 | Roberts | B64C 39/024 |
| 10,573,196 B2* | 2/2020 | Rhodes | G01C 21/20 |
| 2014/0188377 A1* | 7/2014 | Bonawitz | H04B 7/18504 |
| | | | 701/120 |
| 2015/0113379 A1* | 4/2015 | Wakefield | G06T 17/05 |
| | | | 715/227 |
| 2016/0203173 A1* | 7/2016 | Zhang | G06F 16/901 |
| | | | 707/743 |
| 2017/0233054 A1 | 8/2017 | MacCallum et al. | |
| 2019/0035298 A1* | 1/2019 | Rhodes | G09B 9/24 |
| 2020/0191572 A1* | 6/2020 | Candido | B64C 39/024 |
| 2020/0191997 A1* | 6/2020 | Candido | G01W 1/10 |
| 2020/0193843 A1* | 6/2020 | Candido | G08G 5/0047 |

OTHER PUBLICATIONS

Palumbo et al., Balloon Trajectory Prediction Methodologies for the Unmanned Space Vehicles Programme, Proc. 20th ESA Symposium on European Rocket and Balloon Programmes and Related Research' Hyère, France, May 22-26, 2011 (ESA SP-700, Oct. 2011), 7 pages.
Fathpour Nanaz et al., "Feasibility Studies on Guidance and Global Path Planning for Wind-Assisted Montgolifiere in Titan", Titans and its Wind Model, Dec. 1, 2014, pp. 1112-1125, vol. 8, No. 4, IEEE Systems Journal.
Michael T. Wolf et al., "Probabilistic Motion Planning of Balloons in Strong, Uncertain Wind Fields", May 3, 2010, pp. 1123-1129, IEEE International Conference on Robotics and Automation.
International Application No. PCT/US2019/066935, International Search Report and Written Opinion dated Jun. 25, 2020, 22 pages.

* cited by examiner

WIND DATA BASED FLIGHT MAPS FOR AIRCRAFT

CROSS REFERENCE TO RELATED APPLICATIONS

This application is related to co-pending U.S. patent application Ser. No. 16/222,614, entitled "WIND DATA BASED FLIGHT MAPS FOR AIRCRAFT," filed concurrently herewith.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a network including stratospheric balloons operating in the stratosphere. To maintain the network, each balloon may be required to be located at and/or to travel to a particular location. However, because the balloons rely on ever-changing wind conditions to assist in navigation efforts to different locations, it is nearly impossible to utilize static maps for planning purposes. In other words, balloons cannot simply follow a road map for navigation. And, as the winds change over short periods of time, for instance from hour to hour the possible routes a balloon may take will change.

BRIEF SUMMARY

Aspects of the present disclosure are advantageous for high altitude balloon systems. For instance, one aspect of the disclosure provides a method for generating a flight map for an aircraft. The method includes for each given slice period of a plurality of slice periods corresponding to a period of time into the future, running, by one or more server computing devices, a plurality of simulations by placing a simulated aircraft within each cell of a grid representing areas of the earth and using predicted wind data for that given slice period. Each of the simulations of the plurality of simulations identifies a cell in which each aircraft is located after the given slice period has passed in the simulation. The method also includes generating, by the one or more server computing devices, a connection graph using any identified cells; using by the one or more server computing devices, the connection graph to determine a flight map for an actual aircraft using a cost function and iterating from a destination cell to an initial cell; using by the one or more server computing devices, the flight map to determine a route for the actual aircraft; and providing by the one or more server computing devices, the route to the actual aircraft.

In one example, the method also includes, partitioning the areas of the earth into the grid using a Hilbert curve. In another example, each given simulation of the plurality of simulations is run by placing a set of two or more simulated aircraft within a first cell of the grid, and the given simulation of the plurality of simulations identifies a probability distribution for an aircraft in the first cell reaching one or more other cells of the grid over the slice period. In this example, for a given cell of the grid, each simulated aircraft of the set of two or more simulated aircraft placed within the given cell are started at a plurality of different altitudes within the given cell. In addition or alternatively, for a given cell of the grid, each simulated aircraft of the set of two or more aircraft placed within the given cell are configured with different fill levels corresponding to different altitudes within the given cell. In another example, the method also includes receiving a current location of the actual aircraft and determining the initial cell based on the current location. In another example, the method also includes receiving a destination location for the actual aircraft and determining the destination cell based on the destination location. In another example, the method also includes determining a connection graph period based on a period of time into the future covered by available wind data, wherein the route corresponds to a time period that is shorter than the connection graph period. In another example, the connection graph is generated to include a plurality of probabilistic connections between pairs of cells over slice periods of the plurality of slice periods. In another example, the connection graph includes direct connections between adjacent cells of the grid and direct connections between non-adjacent cells of the grid. In another example, the cost function is a piecewise separable cost function. In another example, the method also includes receiving flight objective for the actual aircraft and before determining the flight map, selecting the cost function from a plurality of different types of cost functions based on the flight plan. In another example, the plurality of different types of cost functions includes a first cost function for reaching the destination cell as soon as possible and a second cost function for reaching the destination cell a particular point in time. In this example, the plurality of different types of cost functions includes a third cost function for reaching the destination cell by avoiding certain other cells of the grid. In another example, the cost function provides, for a plurality of cells of the grid, a value for a given cell of the plurality of cells corresponding to an amount of time to reach the destination cell from the given cell of the plurality of cells. In this example, determining the flight map includes starting from the initial cell and using the values provided by the cost function to determine a lowest cost path from the initial cell to the destination cell. In addition or alternatively, determining the flight map includes starting from the initial cell and using the values provided by the cost function to determine a schedule of altitude changes for reaching the destination cell. In another example, the route includes a schedule of altitude changes at different locations. In another example, the method also includes receiving new predicted wind data for a period beyond the period of time into the future; generating a new connection graph using the new predicted wind data and running a plurality of new simulations; using the new connection graph to determine a new flight map using the cost function and iterating from the destination cell to a new initial cell; using the new flight map to determine a new route; and providing the new route to the actual aircraft. In this example, the method also includes after providing the route, receiving an updated current location of the actual aircraft and determining the new initial cell based on the current location. In another example, the method also includes generating seed connection data for a time beyond the period of time into the future, and wherein determining the flight map is further based on the seed connection data. In another example, generating the seed connection data includes determining average transit times between cells of the grid using historical wind data including connection data for a plurality of slice periods. In this example, generating the seed connection data includes determining an average value for each cell of the grid using the average transit times. In addition or alternatively, generating the seed connection data includes comparing wind data for a given slice period of the connection graph to the historical wind data to identify a predetermined number of slice periods of the plurality of slice periods of the historical wind data. In this example, the given slice period is a first slice period in time for the connection graph. In addition or alternatively, generating the seed connection data includes, for each of the predetermined number of slice periods, identifying a slice period of the historical wind data based on a period of the connection graph. In this example, generating the seed connection data includes, for a given cell of the grid, taking an average of any identified slice periods. In addition r alternatively, generating the seed connection data includes determining average transit times between cells of the grid over a predetermined period of time using historical wind data including connection data for a plurality of slice periods. In this example, the method also includes determining the predetermined period of time based on a calendar month for a first slice period in time for the connection graph. In addition or alternatively, the method also includes comparing wind data for a first slice period in time to a plurality of clusters of historical wind data in order to identify a cluster of the clusters, and the seed connection data is generated based on the identified cluster.

Another aspect of the disclosure provides a method for generating a flight map for an aircraft. The method includes generating, by one or more server computing devices, a flight map using a connection graph identifying estimates of flight times between locations in the connection graph for a period of time into the future; running, by the one or more server computing devices, a plurality of simulations using a set of characteristics for the aircraft, a destination location, and the flight map; receiving, by the one or more server computing devices, for each of the plurality of simulations, output identifying an estimate of time for the aircraft to reach the destination location and an amount of time for the aircraft to reach the destination location; using, by the one or more server computing devices, the output to generate a refined flight map; using, by the one or more server computing devices, the refined flight map to determine a route for the aircraft; and providing, by the one or more server computing devices, the route to the aircraft.

In one example, the set of characteristics define a configuration of the aircraft including, at least, an envelope type and a power configuration for the aircraft. In this example, the set of characteristics further includes a configuration of solar panels. In another example, the method also includes receiving from the actual aircraft, a second set of characteristics and prior to using the refined flight map, identifying the refined flight map from a plurality of refined flight maps based on the set of characteristics and the second set of characteristics. In another example, the method also includes selecting a starting location for each of the plurality of simulations, and wherein the selected starting locations are used to run the plurality of simulations. In this example, selecting each starting locations is based on a random selection of locations of the flight map. In addition or alternatively, selecting each starting location is based on a launch location for the aircraft. In addition or alternatively, selecting each starting location is based on expected locations of aircraft. In another example, the connection graph includes a plurality of cells, and the connection graph identifies estimates of flight times between cells in the connection graph. In this example, the refined flight map includes a second plurality of cells corresponding to the plurality of cells. In addition, the method also includes receiving a current location of the aircraft and determining an initial cell of the second plurality of cells based on the current location. In another example, the method also includes receiving a destination location for the aircraft and prior to using the refined flight map, identifying the refined flight map from a plurality of refined flight maps based on the destination location. In this example, generating the flight map includes using a cost function. In addition, the cost function is a piecewise separable cost function. In addition or alternatively, the method also includes receiving flight objective for the aircraft and before generating the flight map, selecting the cost function from a plurality of different types of cost functions based on the flight objective. In this example, the plurality of different types of cost functions includes a first cost function for reaching the destination location as soon as possible and a second cost function for reaching the destination location a particular point in time. In addition, the plurality of different types of cost functions includes a third cost function for reaching the destination location by avoiding certain other areas of the grid. In another example, the route includes a schedule of altitude changes at different locations of the refined connection graph. In another example, the method also includes receiving new predicted wind data for a period beyond the period of time into the future; generating a new connection graph using the new predicted wind data and running a first plurality of new simulations, the new connection graph identifying estimates of flight times between locations in the new connection graph; generating a new flight map using the new connection graph; running a second plurality of new simulations using the set of characteristics for the aircraft and the destination location, and the new flight map; receiving, for each of the second plurality of new simulations, output identifying an estimate of time for the aircraft to reach the destination location and an amount of time for the aircraft to reach the destination location; using the output to generate a refined new flight map; using the refined flight map to determine a second route for the aircraft; and providing the second route to the aircraft. In another example, the method also includes running a second plurality of simulations using the set of characteristics, the destination location, and the refined flight map; receiving, for each of the second plurality of simulations, output identifying an estimate of time for the aircraft to reach the destination location and an amount of time for the aircraft to reach the destination location; and using the output to generate a further refined flight map.

DETAILED DESCRIPTION

Overview

Figure 1:
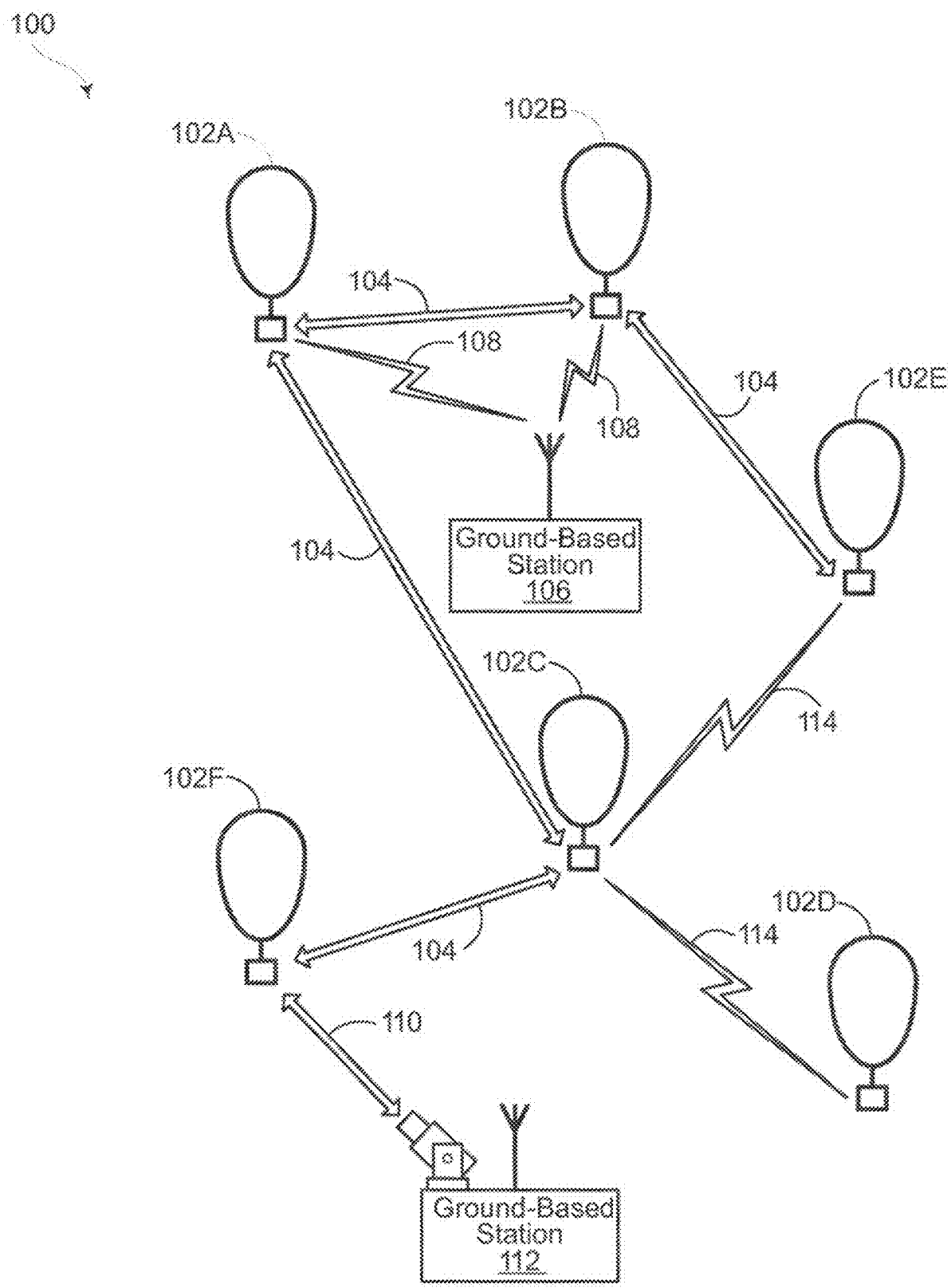
FIG. 1 is a functional diagram of a system in accordance with aspects of the present disclosure.

The present disclosure generally relates to a system for planning flights of aircraft that are dependent or effected by winds for their navigation systems such as aircraft including high-altitude balloons, gliders, certain types of airplanes, airships, etc., for instance, of a duration of one or more days. The system may utilize real time and weather forecast data to generate a connection graph connecting different locations around the world. This connection graph may then be used to determine a flight map as well as a schedule of altitude changes for a particular balloon given its current location and a desired location. The flight map and/or schedule of altitude changes may then be sent to the particular balloon. At the same time, updated location information for the particular balloon may be received. In addition, as the forecasts are updated, the connection graph may be updated, and so too the flight map based on the updated location information.

In order to generate the connection graph, areas of the earth may be partitioned into a grid. The grid may include a plurality of cells representing discrete volumes of space. For instance, each cell may represent a plurality or a range of different altitudes over a given geographic area.

Simulations may then be run by placing a simulated aircraft for instance at a center of each cell of the grid and identifying the cell in which each aircraft ends up after a predetermined period of time, hereafter referred to as a "slice" period, has passed. In order to do this, weather forecast data may be used to simulate how the aircraft would move from the initial cell to another cell of the grid over the course of the slice period. The result of each simulation may be the identification of one or more cells in which each aircraft is located at the end of the simulation or rather, after the given slice period has passed in the simulation.

The simulations may actually be performed for a plurality of different altitudes (or envelope pressures) within the same cell. To keep the simulations simple, certain characteristics of aircraft related to aircraft state likely to change across different aircraft may be ignored when running the simulations.

In addition to running simulations for a first slice period, further simulations may be run for the next slice period, the next slice period after that, and so on. The simulations for the next slice period may be dependent upon the results of the prior slice period. For instance, the identified cell or cells from the prior slice period may be used as the starting point for the next slice period. In addition, to ensure accuracy of the predictions, the simulations may actually be run for a set of aircraft in a given cell and altitude combination rather than only a single aircraft as in the example above. The server computing devices 410 may continue to run the simulations through additional slice periods through the end of the wind data. A connection graph may be generated using any identified cells. The result of the simulations may be a plurality of probabilistic connections between cells over different slice periods. This data may be aggregated into a connection graph corresponding to the aforementioned grid and cells. In this regard, each grid cell of the connection graph may include data for each slice period or for a single slice period.

The connection graph may be used to determine a flight map for an actual aircraft using a cost function and iterating from a destination cell to an initial cell. In order to generate the flight maps, searches over the connection graph may be performed in order to determine a route from a first location to a second location over some period of time. Given the first location, a second location, and a flight objective, the connection graph may be searched using a value iteration approach in order to generate a flight map. This may involve determining values identifying how long it would take for an aircraft to reach the destination cell starting from the starting cell and iterating through the connected cells of the connection graph using a cost function. A plurality of different types of cost functions may be utilized to determine the flight maps. Which type of cost function to use to generate a flight map may be determined based on a flight objective for a given aircraft for which the flight map is being generated. The values between cells may then be aggregated into a flight map which identifies a "cost" determined in time for going from one cell to another "connected cell" in the graph.

The flight map may be used to determine a route for the actual aircraft. This may be achieved, for instance, by following a path of lowest values, or rather a minimum path between pairs of grid cells in the flight map, starting from the current cell (of the aircraft that requested the flight map) until the path eventually reaches the destination cell. In this regard, the path may involve moving between different altitudes at different locations in order to follow the minimum path. As such, a schedule of altitude changes at the different locations for the aircraft to follow this path or route may be determined. The route may then be provided to the aircraft. For instance, the flight map, path, and/or schedule of altitude changes may then be sent to and used by the aircraft in order to maneuver the aircraft towards the destination cell.

In addition, each time new wind data is available to be received or retrieved the connection graph may be rebuilt using the new wind data. Once the new connection graph is generated, new flight maps may also be generated. Of course, over time, the locations of the aircraft may change. Thus, each aircraft may periodically provide a status message updating its telemetry, including the aircraft's current location. As such, the new flight maps, paths, and schedules of altitude changes may be generated using the updated current locations of each aircraft.

Of course, because the connection graph is limited in time according to how far into the future the predictions of wind data go, if the flight planning goes beyond this period, additional information is required. Various different approaches may be used to determine how to "bootstrap" or "seed" the connection graph with this information.

Because the simulations used to generate the connection graphs are somewhat "generic", that is, these simulations only rely on latitude, longitude, time and pressure and do not take into account the specific features of different types of aircraft, the connection graph may tend to overestimate the time to reach areas around no-fly areas and to underestimate the time to reach other areas. To address these issues, additional simulations may be run in order to generate refined connection graphs for aircraft having specific characteristics to allow those aircraft to reach a desired destination location. For each simulation, the input may be the flight maps generated from the connection graphs using one of the cost functions, a starting location for the aircraft, a destination location, as well as a set of characteristics. The output of each of the simulations may be an estimate of time for the aircraft with the set of characteristics to reach the destination location as well as the path that the aircraft followed from the starting location to the destination location. As such, any simulations that do not reach the destination location may be discarded. Using any remaining simulations, a refined flight map may then be generated by iterating through the output of each simulation in order to determine an estimate for the aircraft to reach each cell it passed through during the simulation. These values may be aggregated across simulations to generate a refined flight map for the set of characteristics. These refined flight maps may then be used to determine a flight map as well as a schedule of altitude changes for a particular aircraft given its current location, a desired destination location, and a set of characteristics. The flight map and/or schedule of altitude changes may then be sent to the particular aircraft that requested the flight map and/or schedule of altitude changes.

The features described herein provide a way to generate refined flight maps for aircraft during ever-changing wind conditions. For instance, as the forecasts are updated, the connection graph may be updated, and so too the flight maps and refined flight maps, and schedules of altitude changes. In addition, given that the flight maps are generated using cost functions related to flight objectives this allows the flight planning for a given aircraft to be directly related to these objectives, including reducing transit times between locations, reaching a certain location at a certain time, and avoiding certain locations. Moreover, because the connection graph is limited to the period of time through which predicted wind data is available, the flight maps may be projected beyond this period using seeding by historical data. This allows for both short and long duration flight planning.

Example System

FIG. 1 depicts an example system 100 in which an aircraft as described above may be used. This figure should not be considered as limiting the scope of the disclosure or usefulness of the features of the present disclosure. For example, the techniques described herein can be employed on various types of aircraft and systems. In this example, system 100 may be considered a "balloon network" though in addition to balloons the network may include other types of aircraft. As such, the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
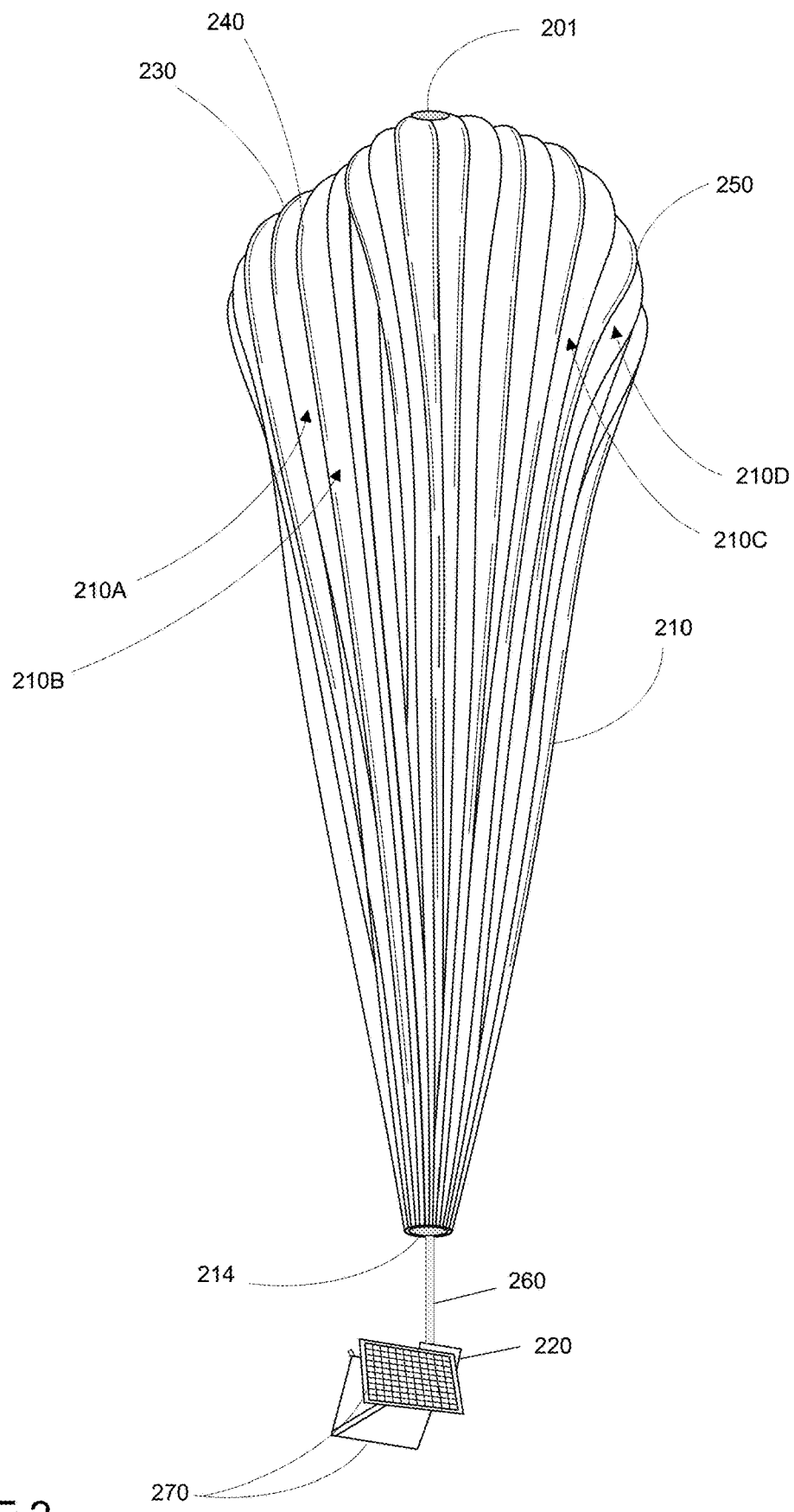
FIG. 2 is an example of a balloon in accordance with aspects of the present disclosure.

FIG. 2 is an example balloon 200, which may represent any of the balloons of the system 100. As shown, the balloon 200 includes an envelope 210, a payload 220 and a plurality of tendons 230, 240 and 250 attached to the envelope 210. The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage (similar to processors 420 and memory 430 described below). The payload 220 may also include various other types of equipment and systems (not shown) to provide a number of different functions. For example, the payload 220 may include various communication systems such as optical and/or RF, a navigation system, a positioning system, a lighting system, an altitude control system (configured to change an altitude of the balloon), a plurality of solar panels 270 for generating power, a power supply (such as one or more batteries) to store and supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230, 240, 250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. A corresponding apparatus, e.g., bottom cap 214, may be disposed at a base or bottom of the balloon envelope 210. The top cap 201 at the apex may be the same size and shape as and bottom cap 214 at the bottom. Both caps include corresponding components for attaching the tendons 230, 240 and 250 to the balloon envelope 210.

Figure 3:
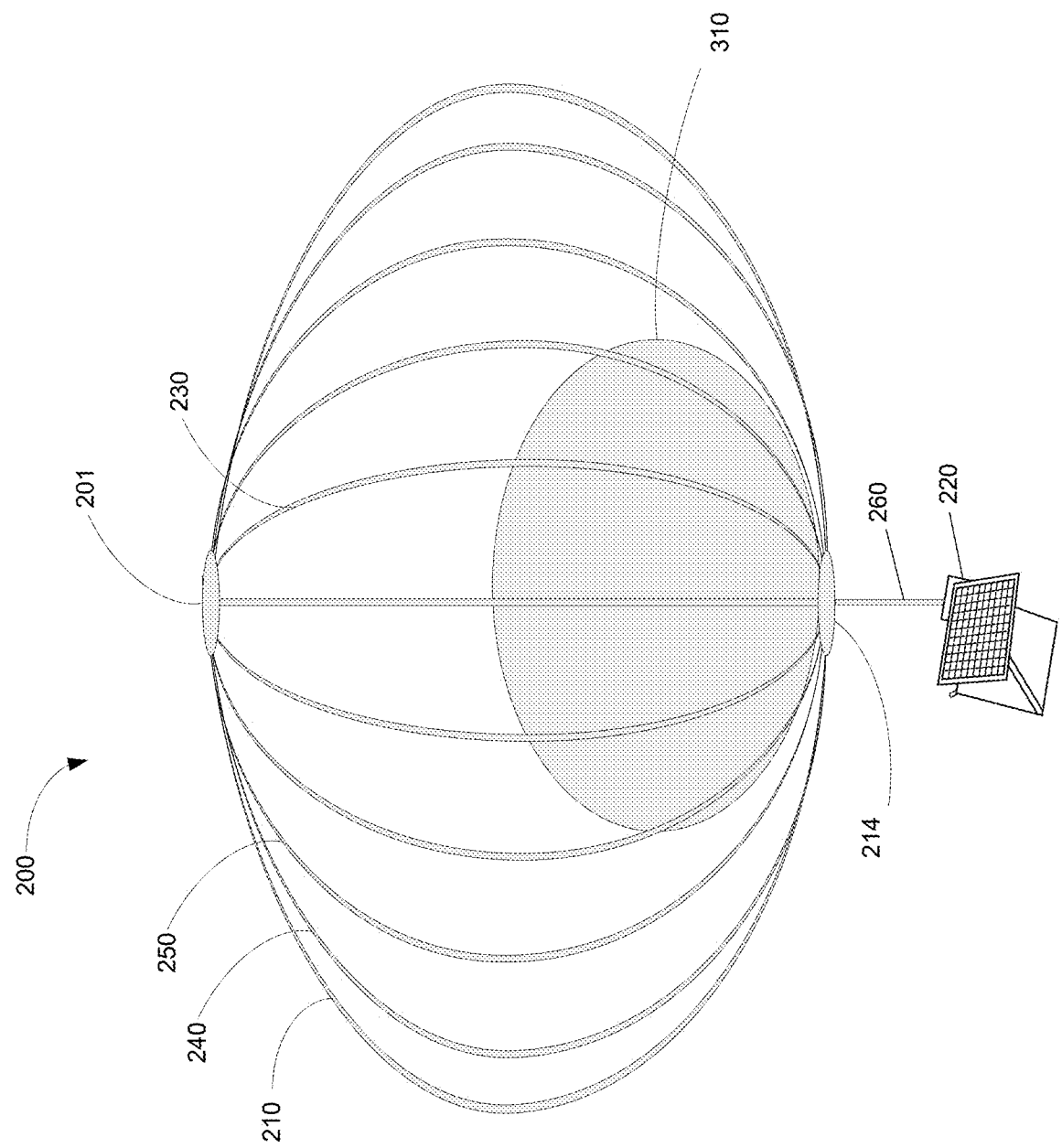
FIG. 3 is an example of a balloon in flight in accordance with aspects of the disclosure.

FIG. 3 is an example of balloon 200 in flight. In this examples, the shapes and sizes of the balloon envelope 210, connection 260, ballast 310, and payload 220 are exaggerated for clarity and ease of understanding. During flight, these balloons may use changes in altitude to achieve navigational direction changes. For example, the altitude control system of the payload 220 may cause air to be pumped into the ballast 310 within the balloon envelope 210 which increases the mass of the balloon and causes the balloon to descend. Similarly, the altitude control system may cause air to be released from the ballast 310 (and expelled from the balloon) in order to reduce the mass of the balloon and cause the balloon to ascend.

Example Server System

Figure 4:
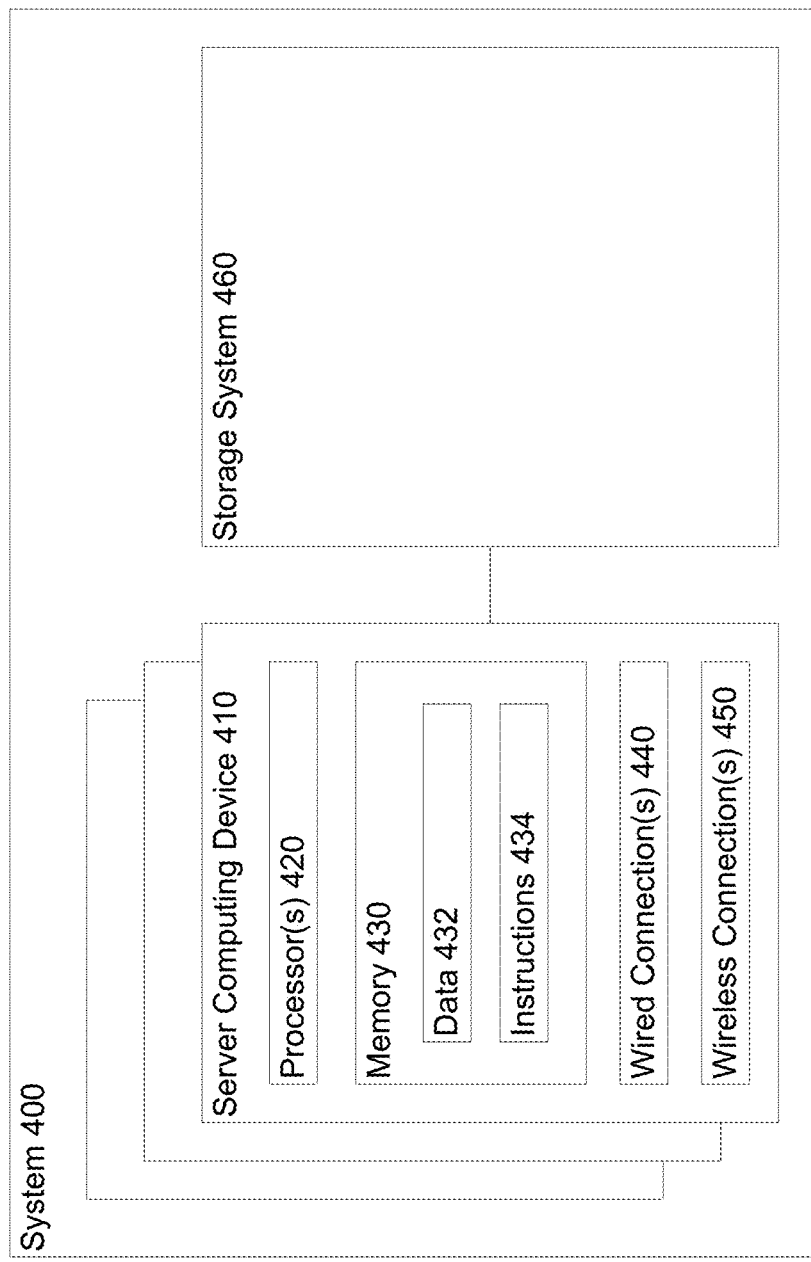
FIG. 4 is an example server system in accordance with aspects of the disclosure.

FIG. 4 is an example of a server system 400 which may be, for instance, incorporated into ground base stations 106, 112. As shown, the server system 400 includes one or more server computing devices 410 and a storage systems 450 as shown in FIG. 4. For instance, each of ground base stations 106, 112 may be a data center including the storage system 460 as well as the server computing devices 410. In this regard, the server computing devices may function as a load balanced server farm in order to exchange information with different nodes of various networks for the purpose of receiving, processing and transmitting the data to and from other computing devices. As such, each of the one or more server computing devices 410 may include one or more processors 420, memory 430 and other components typically present in general purpose computing devices.

The memory 430 stores information accessible by the one or more processors 420, including instructions 434 and data 432 that may be executed or otherwise used by the processor 420. The memory 430 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 434 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 432 may be retrieved, stored or modified by processor 420 in accordance with the instructions 434. For instance, although the claimed subject matter is not limited by any particular data structure, the data may be stored in computing device registers, in a relational database as a table having a plurality of different fields and records, XML documents or flat files. The data may also be formatted in any computing device-readable format. For instance, data may store information about the expected location of the sun relative to the earth at any given point in time as well as information about the location of network targets.

The one or more processor 420 may be any conventional processors, such as commercially available CPUs or GPUs. Alternatively, the one or more processors may be a dedicated device such as an ASIC or other hardware-based processor. Although FIG. 4 functionally illustrates the processor, memory, and other elements of computing device 400 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of server computing devices 410. Accordingly, references to a processor or computing device will be understood to include references to a collection of processors or computing devices or memories that may or may not operate in parallel.

The server computing devices 410 may also include one or more wired connections 440 and wireless connections 450 to facilitate communication with other devices, such as the storage system 460, one or more information services, and other devices of the system 100. These information services may include, for instance, systems that provide weather predictions from organizations such as the National Oceanic and Atmospheric Administration (NOAA) or the European Centre for Medium-Range Weather Forecasts (ECMWF). The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Storage system 460 may store various types of information as described in more detail below. This information may be retrieved or otherwise accessed by one or more server computing devices, such as the server computing devices 410, in order to perform some or all of the features described herein. As with memory 130, storage system 460 can be of any type of computer storage capable of storing information accessible by the server computing devices 410, such as a hard-drive, memory card, ROM, RAM, DVD, CD-ROM, write-capable, and read-only memories. In addition, storage system 460 may include a distributed storage system where data is stored on a plurality of different storage devices which may be physically located at the same or different geographic locations. Storage system 460 may be connected to the server computing devices 410 directly (i.e. as part of server computing devices 410 and/or via wired connections 440) and/or via a network (i.e. via wired connections 440 and/or wireless connections 450). This network may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Example Methods

In order to generate the connection graph, areas of the earth may be partitioned into a grid. The grid may include a plurality of cells representing discrete volumes of space. For instance, each cell may represent a plurality or a range of different altitudes over a given geographic area. Because the earth is curved surface, the grid may be arranged such that cells closer to the poles are smaller than cells closer to the equator. For instance, the grid may include Google LLC's S2 cells, for instance at Level 7, and/or cells configured using a Hilbert curve. For example, a country like Peru may be associated with 10-12 grid cells.

Figure 5:
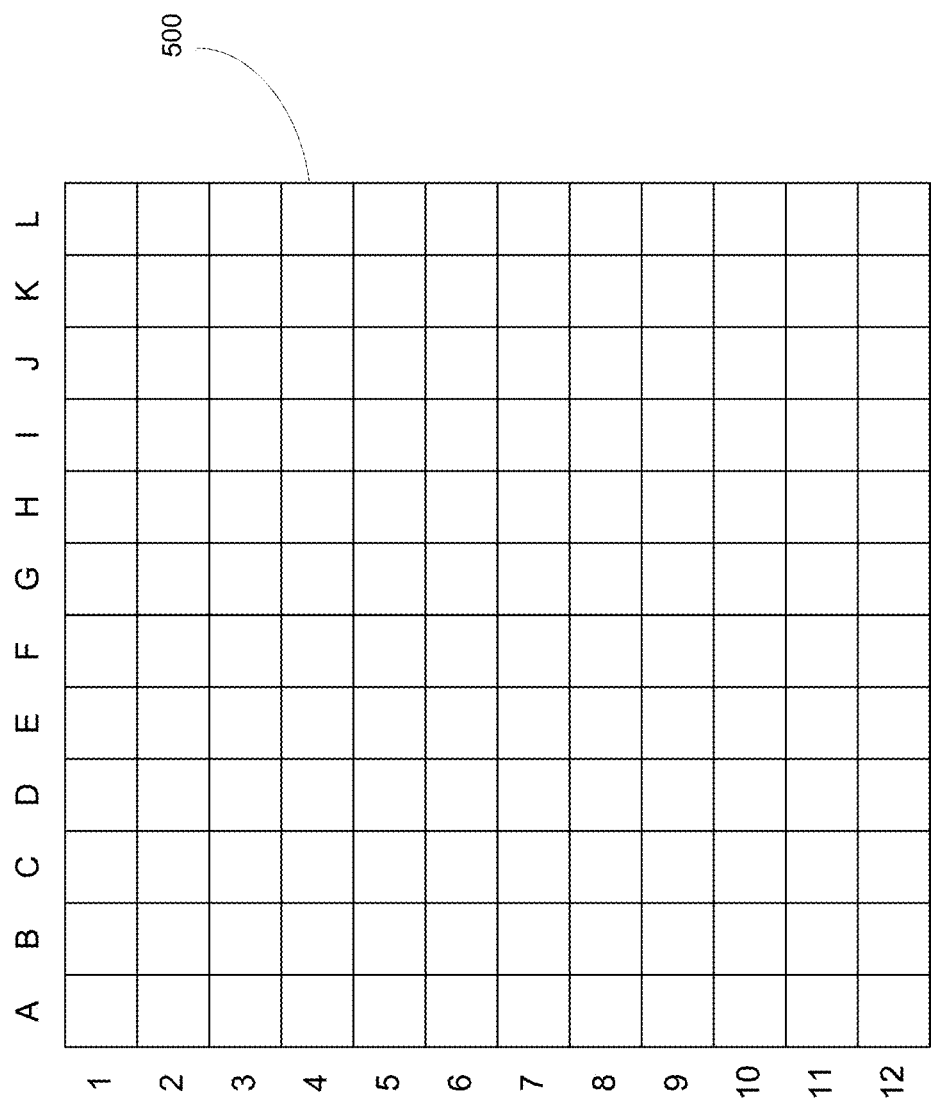
FIG. 5 is an example grid in accordance with aspects of the disclosure.
Figure 6:
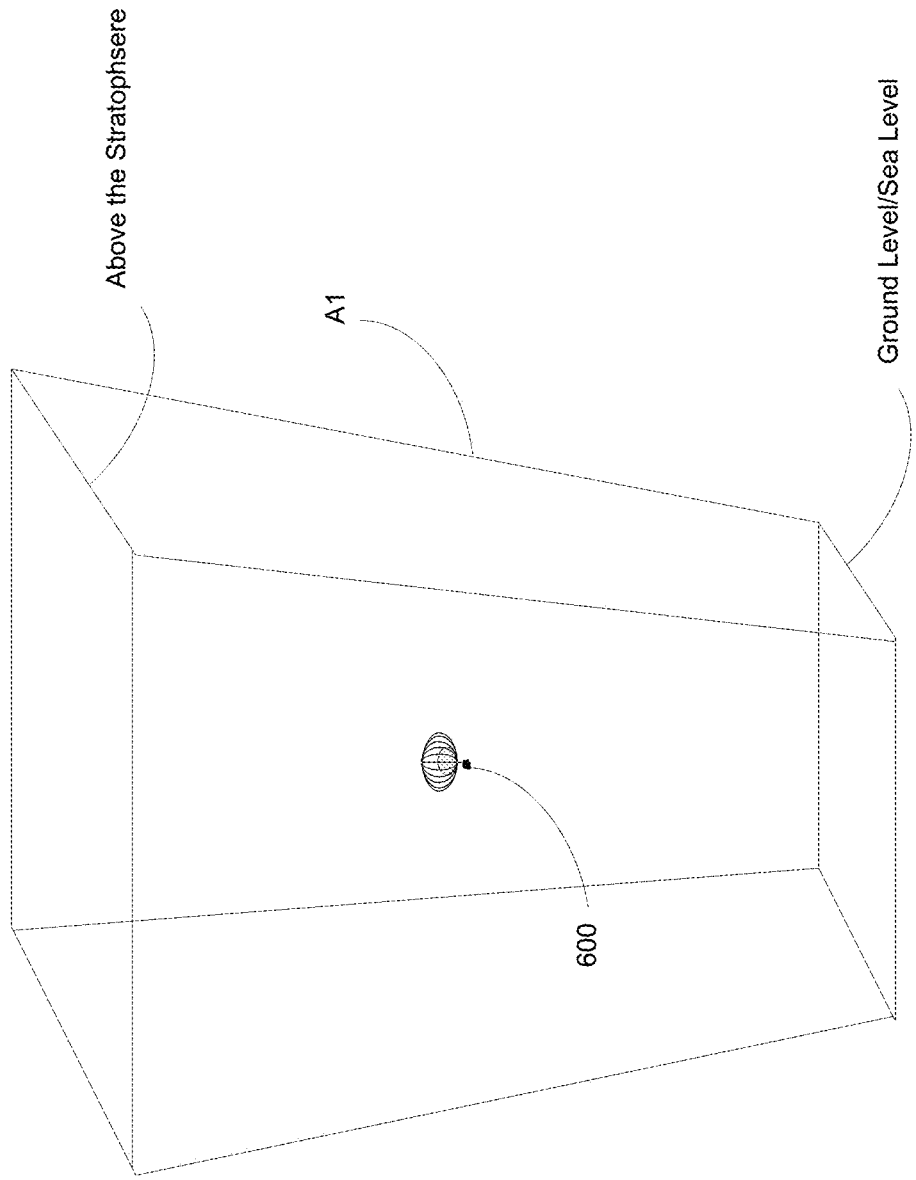
FIG. 6 is an example grid cell and data in accordance with aspects of the disclosure.

FIG. 5 is an example representation of a grid 500 including 120 cells. Each cell includes an identifier, here represented by letters A-L and number 1-12. For simplicity, all of the cells are depicted as squares, though as described above, each cell may actually have a slightly different (e.g. curved or diamond) shape corresponding to the S2 cells. Each cell also represents a geographic area of the earth and some volume of space above that geographic area, for instance including all of the areas below the mesosphere, including the stratosphere. FIG. 6 therefore represents a side-perspective view of a single cell, here cell A1. As shown, cell A1 is slightly larger in size at the top (just above the stratosphere) than at the bottom (ground or sea level), again due to the curvature of the earth.

Simulations may then be run by the server computing devices 410 by placing a simulated aircraft for instance within each cell of the grid and identifying the cell in which each aircraft ends up after a predetermined period of time, hereafter referred to as a "slice" period, has passed. As an example, a slice period may be 1 hour, 3 hours, 1 day, etc. In order to do this, weather forecast data may be used to determine how the aircraft would move from the initial cell to another cell of the grid over the course of the slice period. The simulated aircraft may be placed at a representative point, such as a center of the cell at a given altitude. The result of each simulation may be the identification of one or more cells in which each aircraft is located at the end of the simulation or rather, after the given slice period has passed in the simulation. In this regard, the simulation may simply ignore the possibility of changes in altitudes.

Figure 7:
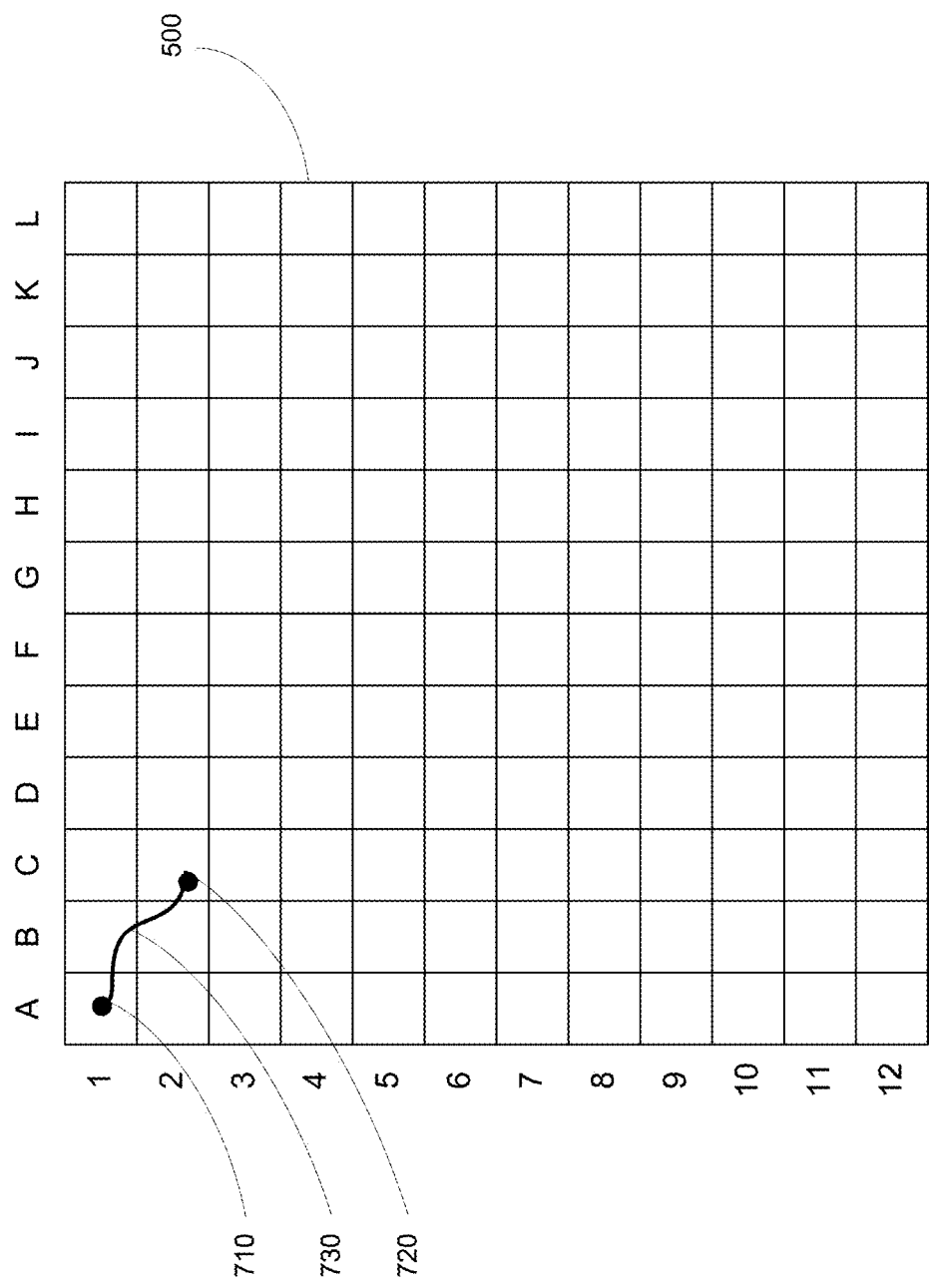
FIG. 7 is an example grid and data in accordance with aspects of the disclosure.

For instance, as shown in FIG. 6, a simulated balloon 600 is placed at a center of cell A1 at particular altitude. The flight of the simulated balloon 600 is then simulated over a slice period, for instance, of one hour. During the simulation, the simulated balloon traverses path 730 from location 710 to location 720. The simulation ends with the simulated aircraft ending up at a particular latitude and longitude. For instance, simulated balloon 600 reaches location 720 as shown in FIG. 7. This latitude and longitude may correspond to a particular cell of the grid, here cell C2. Thus, this cell may be an identified by the simulation. In some instances, rather than identifying a single cell, a set of cells closest to the latitude and longitude, such as 4 or more or less, may be identified from a simulation. For instance, in the example of FIG. 7, cells C2, B2, C3 and B3 may be identified.

Figure 8:
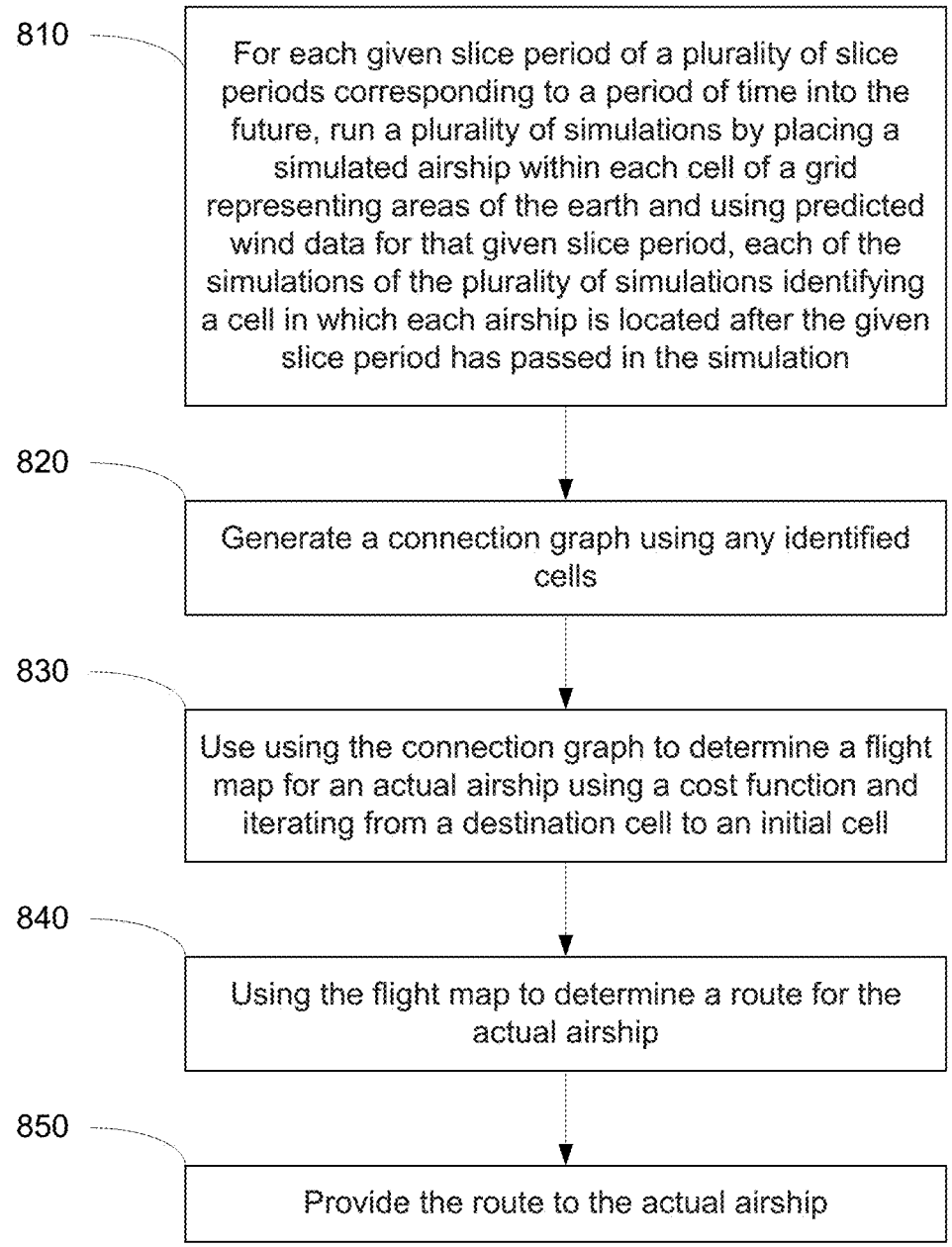
FIG. 8 is an example a flow diagram in accordance with aspects of the disclosure.

FIG. 8 is an example flow diagram 800 in accordance with aspects of the disclosure which may be performed, for instance, by one or more of the server computing devices 410 including the processors 120, in order to generate a flight map for an aircraft. In this example, at block 810, for each given slice period of a plurality of slice periods corresponding to a period of time into the future, running a plurality of simulations by placing a simulated aircraft within each cell of a grid representing areas of the earth and using predicted wind data for that given slice period. Each of the simulations of the plurality of simulations identifying a cell in which each aircraft is located after the given slice period has passed in the simulation.

In some instances, each of these cells may then be assigned a weight by the server computing devices 410. The assigned weight may depending on that cell's distance from the latitude and longitude. For instance, cell C2 may be assigned a weight of 0.4, cell B2 may be assigned a weight of 0.3, cell C3 may be assigned a weight of 0.2, and cell B3 may be assigned a weight of 0.1. Each of these probabilities and cell identifiers may then be associated with the cell A1 for a first slice period. This may provide a probability distribution for each cell reaching some other cell over the slice period.

Figure 9:
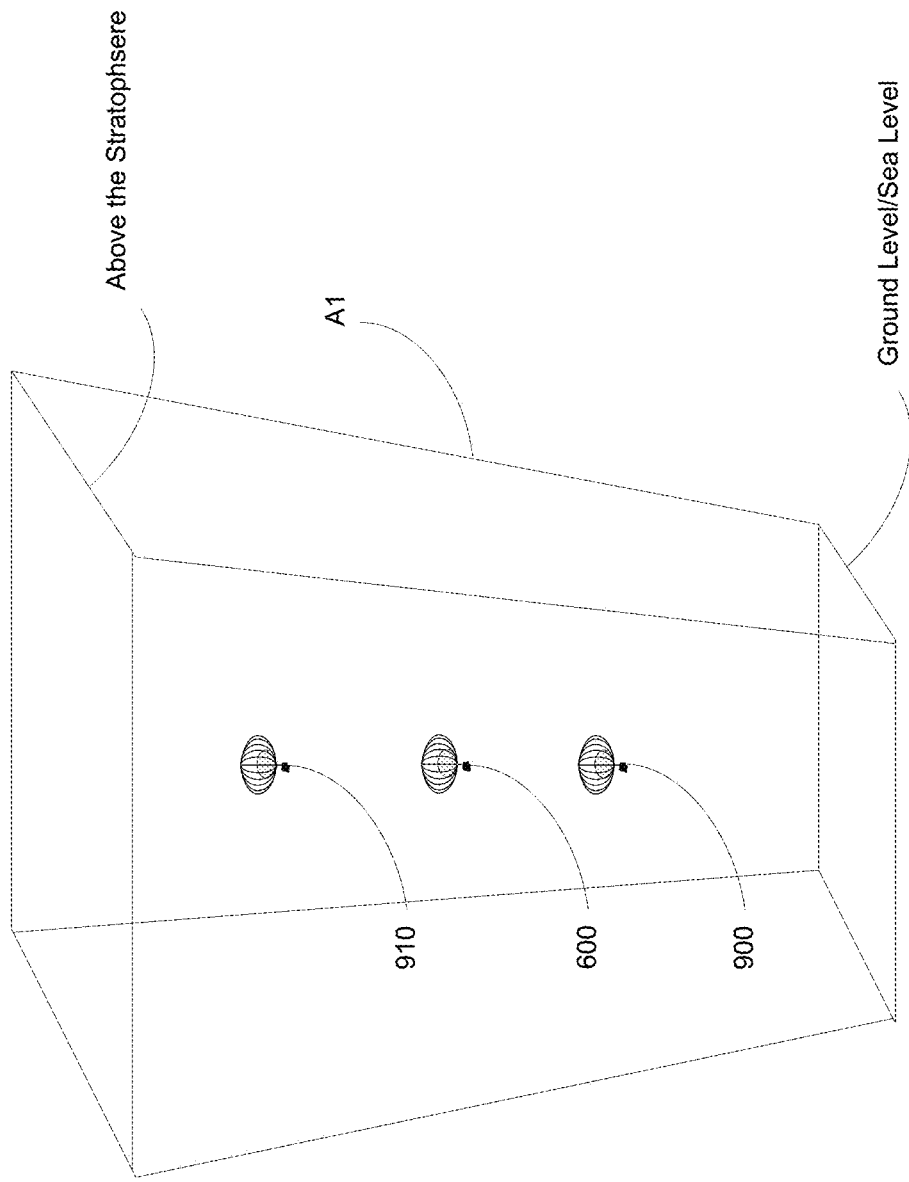
FIG. 9 is an example grid cell and data in accordance with aspects of the disclosure.

The simulations may actually be performed by the server computing devices 410 for a a set of different altitudes within the same cell. As an alternatives to altitudes, each of the simulated balloons may simply be given a different pressure or fill level (i.e. different combinations of lift gas and ballast gas) for the balloon's envelope. For instance, as shown in FIG. 9, simulated balloons 900, 910 may be placed at different altitudes (or pressures) from simulated balloon 600 for cell A1 and the first slice period. Simulations may then be run for the first slice period and each of simulated balloons 600, 900, 910. Again, each of the simulations of the plurality of simulations identifying a cell in which each aircraft is located after the given slice period has passed in the simulation, and these cells may then be assigned weights as described above. Alternatively, rather than simulating a plurality of balloons for a set of different, predetermined altitudes within the same cell, a number of balloons may be either uniformly or randomly spaced within the volume of the cell (i.e. at different latitude, longitudes and altitudes). To keep the simulations simple, certain characteristics of aircraft related to aircraft state likely to change across different aircraft may be ignored when running the simulations. For instance, if the aircraft is a balloon such as balloon 200, the characteristics may include, for instance, payload mass, ballast mass, pressure (or height), altitude above sea level, vertical velocity, rotational velocity, horizontal velocity, relative rotations of components of the balloon, whether a despin mechanism (that adjusts for the relative rotations) is functioning, gas composition of the gasses in the envelope, a super pressure limit (how high the balloon can go before failing or starting to experience failure), percentage of total volume of the ballonet, status of the various components of the balloon (whether anything has been damaged), thermal conditions of the components of the balloon, envelope composition (the type of film, configuration and shape of the balloon), ballonet composition (the type of film, configuration and shape of the ballonet), solar conditions (relative location of the sun), battery configuration and state (number, capacity, currently charging or discharging, rates of same, current charge level, low battery limit, etc.), energy conditions (net energy loss or gain between incoming solar power and outgoing power to the components of the balloon), structure and configuration of the solar panels (number, physical arrangement, power output, etc.), altitude control system parameters (state, current target pressure or altitude), payload component conditions (power consumption rates under different payload conditions, efficiency, speeds of various motors, radio and/or optical communications configurations, and various other parameters related to the balloon and/or the environment in which the balloon is being flown.

In addition to running simulations for a first slice period, further simulations may be run by the server computing devices 410 for the next slice period, the next slice period after that, and so on. For instance, if the first slice period is 1 hour form the present time, the next slice period would be one hour from the present time until two hours from the present time, and so on. In some instances, the simulations for different slice periods may be run independently from one another. In this regard, simulations for different slice periods may be run in parallel with one another. Again, simulated aircraft may also be placed at the set of different altitudes, and a corresponding simulation may be run for each altitude of the set.

In addition, to better characterize uncertainty of the predictions, the simulations may actually be run by the server computing devices 410 for a set of aircraft in a given cell and altitude combination rather than only a single aircraft as in the example above. As an example, a set may include 2 or more aircraft, such as 10 aircraft or more or less. However, this may further increase the number of simulations across slice periods.

The server computing devices 410 may continue to run the simulations through additional slice periods through the end of the wind data. Typically, the maximum period for "medium-range" weather predictions provided by organizations such as NOAA and ECMWF is 10-15 days. As such, this may define the period of time over which the connection graph can be used to make predictions or the connection graph period. Thus, the simulations may be run over the course of enough slices to reach the end of the connection graph period, or rather, 10 or 15 days or so.

Returning to FIG. 8, as shown in block 820, a connection graph is generated using any identified cells. As noted above, the result of the simulations may be a plurality of probabilistic connections between cells starting at different altitudes over different slice periods. Because multiple balloons are placed in each cell during each slice period at different altitudes, the connection graph may identify which altitude moves an aircraft to the next best cell (e.g. a cell that moves the aircraft towards its destination or other goal). This may then be used to determine altitude instructions for different cells when traversing the grid. For instance, returning to the example of FIG. 7, the connection graph may identify cells C2, C3, B2, and B3 as being connected to cell A1 with the probabilities mentioned above for the first slice period and a particular altitude. This data may be aggregated by the server computing devices 410 into a connection graph corresponding to the aforementioned grid and cells. In this regard, each grid cell of the connection graph may include data for each slice period or for a single slice period. In this regard, there may be a single connection graph for all slice periods or distinct connection graphs for each slice period. As an example, these relationships may be implemented as a key-value store, where the key identifies the cell and time (e.g. slice period) and the value is the connection data. In this regard, each value need not be grouped by grid cell or by time slice, but can easily be grouped by either. The value may also include additional information such as the probability of reaching a region that an aircraft should not fly into (i.e a no-fly zone).

Because of the way that aircraft move (and are stimulated to move) grid cells may be connected to cells which are not necessarily adjacent to one another, as shown in the example of path 730 of FIG. 7. This is because connections are dependent upon wind direction and speed and not simply location. As such, if the wind speed is high, simulated aircraft may cross over certain grid cells during a given slice period. Thus, a grid cell may not necessarily be connected to an adjacent grid cell for the given slice period. In some instances, to simplify the connection graph or graphs, changes in altitudes caused during the simulations (if any) may be ignored. Rather, the connection graph may identify which cell can be reached (and not necessarily at which altitude) when starting from a specific altitude at the beginning of a particular slice period.

Returning to FIG. 8, the connection graph is used to determine a flight map for an actual aircraft using a cost function and iterating from a destination cell to an initial cell as shown in block 830. In order to generate the flight maps, searches over the connection graph may be performed in order to determine a route from a first location to a second location over some period of time. For instance, a request for a flight map or schedule of altitude changes may be received by the server computing devices 410 from an aircraft. As an example, the computing devices of a payload of a particular aircraft, such as balloon 200, may send a request. This request may identify a current location of the balloon 200 and in some instances, a target or destination location for the balloon 200. These target locations for different aircraft may be received and/or determined by the server computing devices 410 periodically. These target locations may also be tracked in the storage system 460 by the server computing devices 410. In addition, the server computing devices 410 may also identify a cell of the grid given the current and target locations and vice versa.

Given the first location (i.e. a current location of an aircraft as a latitude, longitude or a particular cell), a second location (i.e. a destination location of an aircraft as a latitude, longitude or a particular cell), and a flight objective, the connection graph may be searched by the server computing devices 410 using a value iteration approach and a cost function in order to generate a flight map. This may involve determining values identifying how long it would take for an aircraft to reach the destination cell starting from the starting cell and iterating through the connected cells of the connection graph. In this regard, the value of the destination cell may be zero (i.e. it would take zero time to reach the destination cell).

As one example, a value iterative approach may include iterating through a Bellman equation such as:

$$V(x, t) = \min_u E[c(x, u, t) + \alpha V(x_u, t+s)]$$

Where V is a value representing a running cost, for instance going forward from a current point in time. In this example, cost to the aircraft may be measured in time. The running cost V may be determined from the minimum expected value E for a given option for the current location or $\min_u$. In this regard, u may represent a starting pressure or altitude. In some instances, u may also include a chosen speed and/or direction of lateral control. The value x may represent a current or starting location, for instance a current cell, and $x_u$ may represent the cell location after a slice period has passed (i.e. the final location of the aircraft given the starting pressure or altitude). The value t may represent a current or starting time (e.g. a current or starting time for the slice period, and s may represent s may represent the length of a slice period (such as 1 hour). In this regard, t+s may represent the ending time of the slice period. The symbol α may represent a discounting factor (typically 1 or close to one) which makes the costs (i.e. time) out into the future (i.e. closer to t+s) less of a penalty as compared to times closer to the beginning of the slice period (i.e. closer to t). The function c(x,t,u) may represent a cost function dependent on the values of x, t and u.

A plurality of different types of cost functions may be utilized to determine the flight maps. Each of these cost functions may be piecewise separable to enable computation of the value function V by dynamic programming methods such as the aforementioned value iteration. This allows for the evaluation between segments of individual connected cells independent of the evaluation of larger segments over many cells.

Which type of cost function to use to generate a flight map may be determined based on a flight objective. Thus, for each different flight objective, a new flight map must be generated and may be assigned to a particular aircraft. Flight objectives for different aircraft may be received periodically and/or may be tracked in the storage system 460 by the server computing devices 410. For instance, one type of flight objective may attempt to get the aircraft to the destination location by avoiding certain grid cells. In this regard, the flight objective may identify cells to be avoided. This type of flight objective may be useful for avoiding no-fly zones, etc. and may also involve setting the initial values of these cells to very high values (such as 100 days). An example cost function for this type of flight objective, $c_{avoid}$, may include:

$$c_{avoid}(x, t, u) = \begin{cases} 100, & \text{if } x = \text{nofly} \\ s, & \text{otherwise} \end{cases}.$$

The value nofly may refer to areas, or cells, through which the aircraft is not able to or should not fly. In other words, if x=nofly, there may be some point on a trajectory between x and $x_u$ which may intersect with areas, or cells, through which the aircraft is not able to or should not fly.

As another instance, one type of flight objective may attempt to get the aircraft to the destination location as soon as possible. An example cost function for this type of flight objective, $c_{asap}$, may include:

$$c_{asap}(x, t, u) = \begin{cases} 0, & \text{if } x = \text{target} \\ 100, & \text{if } x = \text{nofly} \\ s, & \text{otherwise} \end{cases}.$$

Another type of flight objective may identify a particular point in time for the aircraft to reach the destination location. An example cost function for this type of flight objective, $c_{tt}$, may include:

$$c_{tt}(x, t, u) = \begin{cases} 0, & \text{if } x = \text{target and } t = \text{arrival time} \\ 100, & \text{if } x = \text{target at other than the } tt \text{ and} \\ & \text{a final slice period or nofly} \\ s, & \text{otherwise} \end{cases}.$$

The value tt may refer to the particular point in time or the "target time" and the final slice period may refer to a last in time slice period of the connection graph.

The cost functions may also take into consideration additional objectives. For instance, if another flight objective of an aircraft was to avoid flying over large populations of people, this may also be incorporated to any of the other cost functions. For example, for the $c_{asap}$, cost function, this population objective may be added as follows:

$$c_{asap-p}(x, t, u) = \begin{cases} 0, & \text{if } x = \text{target} \\ 100, & \text{if } x = \text{nofly} \\ s + k \cdot p(t) & \text{otherwise} \end{cases}.$$

In this example, p(t) may refer to the population overflown for a particular slice period, and k is a penalty for the number of people (i.e. the population) overflown.

In order to provide an estimate of the expected value for the running cost, the expectation integral may be evaluated over a plurality of simulations. For example, by doing so using the $c_{asap}$ cost function, the following equation may be obtained:

$$V(x, t) =$$

$$\min_u E[c(x, u, t) + \alpha V(x, t+s)] = \min_u \sum_{i=1}^{n} [c(x_i, u, t) + \alpha V(x_{u,i}, t+s)] \times \frac{1}{n}$$

In this example, i may refer to a particular simulation, and n may refer to a total number of simulations. Thus, $$\min_u$$

may refer to the minimum value of the cost over all of the values of u. In this example, $x_i$ may represent a current or starting location for a given simulation, for instance a current cell. In this regard, $x_{u,i}$ may represent not only a cell location after a slice period has passed (i.e. the final location of the aircraft given the starting pressure or altitude) but also a trajectory taken over the slice period. In this regard, the equation may take into consideration the path by which an aircraft was simulated to reach a given location, for instance, around any nofly areas to be avoided, etc. The values may then be aggregated into a flight map which identifies the running cost (V) determined in time for going from one cell to another "connected cell" in the graph. For instance, the flight map may identify that the time to reach any of cells C2, C3, B2, B3 from cell A1 is 1 hour (i.e. the time of the first slice period).

Alternatively, rather than using the expected value E, a different accumulator may be used. For instance, if being more risk averse, the running cost may be evaluated based on the worst case (e.g. the slowest) paths or trajectories. On example of this may include evaluating running cost using the following:

$$V(x, t) = \min_u \max_i [c_{asap}(x_i, u, t) + \alpha V(x_{u,i}, t+s)]$$

In this example, $$\max_i$$

may refer to the maximum value of the cost over the simulations. Alternatively, the running cost may be evaluated based on the lowest uncertainties or rather, by looking at the variances, and thereby utilizing high likelihood outcomes to encourage certainty even where those outcomes may be bad (i.e. high running costs).

Returning to FIG. 8, the flight map is used to determine a route for the actual aircraft as shown in block 840. For instance, a path or route may be determined from the current cell to the destination cell, for instance, by walking backwards in time through the flight map from the destination cell to the current cell. This may be achieved, for instance, by following a path of lowest values, or rather a minimum path between pairs of grid cells in the flight map, starting from the destination cell until the path eventually reaches the current cell. In this regard, the path may involve moving between different altitudes at different locations (i.e. within the volume of space of different cells) in order to follow the minimum path. This path may then be reversed in order to determine how the aircraft should traverse the flight map. As such, a schedule of altitude changes at the different locations for the aircraft to follow this path or route may be determined.

The flight map extends for the same period of time as the connection graph. As such, the flight map may allow for very short term planning, such as for an hour or two from the present time, as well as much longer term planning, such as 15 days from the present time. Knowing the aircraft's current location, the server computing devices 410 may examine the set of locations (e.g. cells) that an aircraft could reach in the next few hours and the uncertainty in reaching those locations. The server computing devices 410 may then chose the actions or altitude changes that would take the aircraft to the optimal places in the flight map in order to reach the destination. For instance, this may be achieved by following the gradient, in terms of time costs, of the connection graph from one location towards the destination location.

Returning to FIG. 8, the route is provided to the actual aircraft at block 850. For instance, the flight map, path, and/or schedule of altitude changes may then be sent to and used by the aircraft in order to maneuver the aircraft towards the destination cell. Because the computations of the connection graph and the flight map are performed remote from the aircraft, for instance at a collection of server computing devices computing the aforementioned connection graphs and flight maps in real time, the aircraft need not include such sophisticated tools and need not expend processing power and efforts to make such calculations. In some situations, the aircraft may move in ways that are not quite in line with the path, for example, due to ever-changing wind conditions, the aircraft may end up in a cell outside of the path. In such cases, when the flight map is available, the aircraft's computing devices may quickly reprocess a new path and schedule of altitude changes and immediately begin implementing that new schedule.

In addition, each time new wind data is available to be received or retrieved by the server computing devices 410 from the aforementioned organizations (NOAA and ECMWF), which may be as often as several times per day, the connection graph may be rebuilt using the new wind data. Once the new connection graph is generated, new flight maps may also be generated. Of course, over time, the locations of the aircraft may change. Thus, each aircraft may periodically provide a status message updating its telemetry, including the aircraft's current location. As such, the new flight maps, paths, and schedules of altitude changes may be generated using the updated current locations of each aircraft.

Of course, because the connection graph is limited in time according to how far into the future the predictions of wind data go, if the flight planning goes beyond this period, additional information is required. For instance, the aforementioned connection graph uses dynamic programming, starting, for example, 15 days in the future and works backwards to determine what altitude changes an aircraft should make to end up in a desired location in sometime in the future. If this can be achieved in less than the connection graph period, for instance less than 15 days, then no other information is needed. However, in many cases, an aircraft will need to plan its travel beyond that connection graph period, for instance, 20 days. As such, this can be a problem as the connection graph only looks as far into the future as there is wind data from NOAA and ECMWF.

Different approaches may be used to determine how to "seed" the connection graph with this information. For instance, historical wind data may be processed as described above and stored as a slice period by slice period historical connection graph. Using the grid and historical wind data (for instance, for the past 35 years or so), an averaged map of how long it will take to reach each cell from each other cell may be generated using the aforementioned technique for the connection graph. In other words, the process will look at the average cost or value such as transit time between cells over the period of the historical wind data and then takes the average of each cell. This seed connection data may be used to determine the flight map as described above and the schedule of altitude changes for an aircraft. While this technique typically provides reasonable results, in some instances, for instance, approximately 20% of the time, the predictions can be quite bad. For instance, in some areas over Brazil, using an average is less useful as winds go in different directions at different times of the year.

To address these issues, an approach which looks for similar historical situations in order to generate seed connection data may be used. In this regard, to determine a seed for a time beyond a period of a current connection graph, the historical wind data may be searched to identify a predetermined number of slice periods with similar wind data. As one approach, the measure of the values at N points in a region of interest of the connection graphs for a given slice period is taken. These N values are input into a vector. The similarity may be defined as the L1 normal between a vector for a slice period of the current connection graph and the vector generated from each slice period of the historical connection graphs. The region of interest may be, for instance, a destination location or cell for an aircraft. For instance, a portion of the connection graph that has a defined value over some period, such as 10 days (assuming the horizon is 10 days) to generate the seed connection data. Depending on the type of map, this may or may not be the portions near the destination. For example, if Puerto Rico is the destination for an aircraft, the server computing devices may only compare the Caribbean portions of the connection graphs for the slice periods and ignore what those connection graphs look like over India.

As another approach, the root-mean-square error (RMSE) between all grid cells of a slice period of the current connection graph and a slice period of the historical connection graph may be used to determine similarity. As another approach, the weighted error (weighted towards earlier terms) of the first N fast Fourier transforms coefficients between a slice period of the current connection graph and a slice period the historical connection graph may be used to determine similarity. As another approach, a similarity metric between two latent states computed by learning an autoencoder through a deep neural network on a slice period of the current connection graph and a slice period of the historical connection graphs may be used to determine similarity. As an example, the slice period used for the current connection graph may be the first slice period (i.e. that closest to the present time), the last slice period (i.e. that 15 days into the future), or some other slice period.

The most similar 10, 20, or more or less slice periods may be selected. Then the seeds may be generated by taking the average of each historical slice period beyond those selected slice periods and using those to seed additional slice periods in the connection graph. This averaging helps to reduce outlier situations. In other words, looking at the first day in a current connection graph corresponding to a period of time of 15 days and a 1 day slice period, the 10 closest 1-day slice periods of the historical wind data may be identified, and then the average of what is 16 days out may be used to predict data for the 16th day from the first day in the current connection graph. This may also be performed for the 17th day, 18th day, and beyond.

Still other approaches may be used to seed the connection graph. For instance, seed could be generated by taking an average of all slices in the historical data for a given period of time (e.g. if today is May 1, the average of all slices in May would be taken). As another alternative, the historical wind data may be clustered and the first day of the connection graph may be compared to the clusters to determine a closest cluster. The data in this cluster may then be average or otherwise reduced in order to generate a seed. As another example, the seeding may be achieved by using random numbers or using a generative model (such as a deep neural network) trained on sequences of maps over a period of time, such as 35 years. The seeded connection graph may also be used to generate statistics over time, for instance, to to estimate quantities of interest. For example, the average and standard deviation of transit times from Puerto Rico to Kenya over our 35 years of wind data.

Because the simulations used to generate the connection graphs are somewhat "generic", that is, these simulations only rely on latitude, longitude, time and pressure and do not take into account the specific features of different types of aircraft, the connection graph may tend to overestimate the time to reach areas around no-fly areas and to underestimate the time to reach other areas. To address these issues, additional simulations may be run in order to generate refined connection graphs for aircraft having specific characteristics to allow those aircraft to reach a desired destination location.

For instance, as in the example above, a request for a flight map or schedule of altitude changes may be received by the server computing devices 410 from an aircraft. As an example, the computing devices of a payload of a particular aircraft, such as balloon 200, may send a request. This request may identify a current location of the balloon 200, a set of characteristics for the balloon, and in some instances, a target or destination location for the balloon 200. These target locations for different aircraft may be received and/or determined by the server computing devices 410 periodically. These target locations and sets of characteristics may also be tracked in the storage system 460 by the server computing devices 410.

Figure 10:
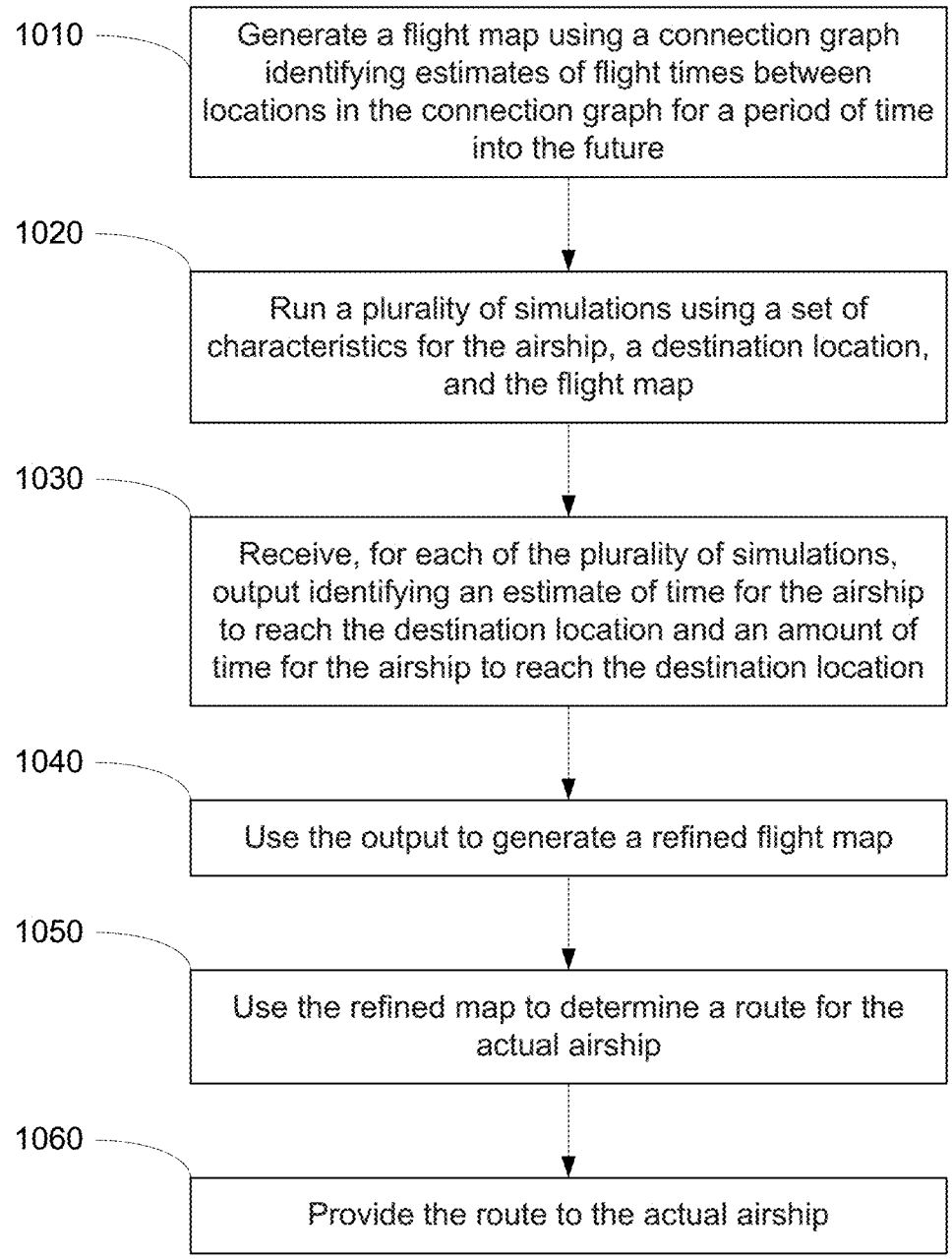
FIG. 10 is an example a flow diagram in accordance with aspects of the disclosure.

FIG. 10 is an example flow diagram 1000 in accordance with aspects of the disclosure which may be performed, for instance, by one or more of the server computing devices 410 including the processors 120, in order to generate a flight map for an aircraft, for instance, in response to a request for the same. In this example, at block 1010, a flight map is generated using a connection graph identifying estimates of flight times between locations in the connection graph for a period of time into the future. The flight map and connection graph may be generated and determined as described above.

At block 1020, a plurality of simulations are generated using a set of characteristics for the aircraft, a destination location, and the flight map. In this regard, for each simulation, the input may be the flight maps generated from the connection graphs using one of the cost functions, a starting location (latitude and longitude or cell) for the aircraft, a destination location (latitude and longitude or cell), as well as a set of characteristics. As for the starting locations, each of these additional simulations may be started at different locations (e.g. latitude, longitude and pressure (altitude) combinations), in a flight map. These locations may be selected by the server computing devices 410 by randomly sampling locations corresponding to locations in the mpa that can be generated without using seed data, biased sampling towards locations where an aircraft is anticipated to pass (for instance, based on a particular launch location for the aircraft), biased sampling towards locations where aircraft (of a fleet of aircraft) are currently located, etc. In addition, each additional simulation may be run with a set of characteristics of a particular type of aircraft.

For instance, if the aircraft is a balloon, the characteristics may include, for instance, payload mass, ballast mass, pressure (or height), altitude above sea level, vertical velocity, rotational velocity, horizontal velocity, relative rotations of components of the balloon, whether a despin mechanism (that adjusts for the relative rotations) is functioning, gas composition of the gasses in the envelope, a super pressure limit (how high the balloon can go before failing or starting to experience failure), percentage of total volume of the ballonet, status of the various components of the balloon (whether anything has been damaged), thermal conditions of the components of the balloon, envelope composition (the type of film, configuration and shape of the balloon), ballonet composition (the type of film, configuration and shape of the ballonet), solar conditions (relative location of the sun), battery configuration and state (number, capacity, currently charging or discharging, rates of same, current charge level, low battery limit, etc.), energy conditions (net energy loss or gain between incoming solar power and outgoing power to the components of the balloon), structure and configuration of the solar panels (number, physical arrangement, power output, etc.), altitude control system parameters (state, current target pressure or altitude), payload component conditions (power consumption rates under different payload conditions, efficiency, speeds of various motors, radio and/or optical communications configurations, and various other parameters related to the balloon and/or the environment in which the balloon is being flown.

At block 1030, for each of the plurality of simulations, output identifying an estimate of cost or time for the aircraft to reach the destination location and an amount of time for the aircraft to reach the destination location is received. In other words, the output of each of the simulations may be an estimate of time for the aircraft with the set of characteristics to reach the destination location (given the cost function used to generate the map) as well as the path that the aircraft followed from the starting location to the destination location. As such, any simulations that do not reach the destination location may be discarded. Of course, this output estimate is made with respect to the type of cost function used to generate the flight map or maps used for the simulations At block 1040, the output is used to generate a refined flight map. For instance, using any remaining simulations, a refined flight map may then be generated by the server computing devices 410 by iterating through the output of each simulation in order to determine an estimate for the aircraft to reach each cell it passed through during the simulation. These values may be aggregated across simulations to generate a refined flight map for the set of characteristics. These maps may thus be indexed by sets of characteristics, and in some instances, the destination location (though this may not always be necessary).

At block 1050, the refined flight map is used to determine a route for the aircraft. These refined flight maps may then be used by the server computing devices 410 to determine a flight map as well as a schedule of altitude changes for a particular aircraft given its current location, a desired destination location, and a set of characteristics. For instance, given the set of characteristics, and in some instances, the desired destination location, an appropriate refined flight map may be identified. From this, a schedule of altitude changes may be determined.

At block 1060, the route is provided to the aircraft. For instance, the flight map and/or schedule of altitude changes may then be sent by the server computing devices 410 to the particular aircraft that requested the flight map and/or schedule of altitude changes. At the same time, the server computing devices 410 may receive updated location information for the particular balloon. In addition, as the forecasts are updated, the connection graph may be updated, and so too the flight map and refined flight map based on the updated location information.

In some instances, even further simulations may be run by the server computing devices 410 using the refined flight maps in order to generate an even further refined flight map, for instance, using a policy gradient approach. Again, these further refined flight maps may then be used by the server computing devices 410 to determine schedules of altitude changes. In addition, each time the connection graph is updated, for instance because new wind data is available, new refined connection graphs may also be generated for each set of characteristics.

The features described herein provide a way to generate refined flight maps for aircraft during ever-changing wind conditions. For instance, as the forecasts are updated, the connection graph may be updated, and so too the flight maps and refined flight maps, and schedules of altitude changes. In addition, given that the flight maps are generated using cost functions related to flight objectives this allows the flight planning for a given aircraft to be directly related to these objectives, including reducing transit times between locations, reaching a certain location at a certain time, and avoiding certain locations. Moreover, because the connection graph is limited to the period of time through which predicted wind data is available, the flight maps may be projected beyond this period using seeding by historical data. This allows for both short and long duration flight planning. In addition, as noted above, each time the connection graph is updated, for instance because new wind data is available, new refined connection graphs may also be generated for each set of characteristics.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating a flight map for an aircraft, the method comprising:
   for each given slice period of a plurality of slice periods corresponding to a period of time into the future, running, by one or more server computing devices, a plurality of simulations by placing a simulated aircraft within each cell of a grid representing areas of the earth and using predicted wind data for that given slice period, each of the simulations of the plurality of simulations identifying a cell in which each aircraft is located after the given slice period has passed in the simulation;
   generating, by the one or more server computing devices, a connection graph using any identified cells;
   receiving a flight objective for an actual aircraft;
   selecting a cost function from a plurality of different types of cost functions based on the flight objective;
   using by the one or more server computing devices, the connection graph to determine a flight map for the actual aircraft using the cost function and iterating from a destination cell to an initial cell;
   using by the one or more server computing devices, the flight map to determine a route for the actual aircraft; and
   providing by the one or more server computing devices, the route to the actual aircraft.

2. The method of claim 1, further comprising, partitioning the areas of the earth into the grid using a Hilbert curve.

3. The method of claim 1, wherein each given simulation of the plurality of simulations is run by placing a set of two or more simulated aircraft within a first cell of the grid, and the given simulation of the plurality of simulations identifies a probability distribution for an aircraft in the first cell reaching one or more other cells of the grid over the slice period.

4. The method of claim 3, wherein for a given cell of the grid, each simulated aircraft of the set of two or more simulated aircraft placed within the given cell are started at a plurality of different altitudes within the given cell.

5. The method of claim 3, wherein for a given cell of the grid, each simulated aircraft of the set of two or more aircraft placed within the given cell are configured with different fill levels corresponding to different altitudes within the given cell.

6. The method of claim 1, further comprising:
   receiving a current location of the actual aircraft; and
   determining the initial cell based on the current location.

7. The method of claim 1, further comprising:
   receiving a destination location for the actual aircraft; and
   determining the destination cell based on the destination location.

8. The method of claim 1, further comprising determining a connection graph period based on a period of time into the future covered by available wind data, wherein the route corresponds to a time period that is shorter than the connection graph period.

9. The method of claim 1, wherein the connection graph is generated to include a plurality of probabilistic connections between pairs of cells over slice periods of the plurality of slice periods.

10. The method of claim 1, wherein the connection graph includes direct connections between adjacent cells of the grid and direct connections between non-adjacent cells of the grid.

11. The method of claim 1, wherein the cost function is a piecewise separable cost function.

12. The method of claim 1, wherein the plurality of different types of cost functions includes a first cost function for reaching the destination cell as soon as possible and a second cost function for reaching the destination cell a particular point in time.

13. The method of claim 12, wherein the plurality of different types of cost functions includes a third cost function for reaching the destination cell by avoiding certain other cells of the grid.

14. The method of claim 1, wherein the cost function provides, for a plurality of cells of the grid, a value for a given cell of the plurality of cells corresponding to an amount of time to reach the destination cell from the given cell of the plurality of cells.

15. The method of claim 14, wherein determining the flight map includes starting from the initial cell and using the values provided by the cost function to determine a lowest cost path from the initial cell to the destination cell.

16. The method of claim 14, wherein determining the flight map includes starting from the initial cell and using the values provided by the cost function to determine a schedule of altitude changes for reaching the destination cell.

17. The method of claim 1, wherein the route includes a schedule of altitude changes at different locations.

18. The method of claim 1, further comprising:
receiving new predicted wind data for a period beyond the period of time into the future;
generating a new connection graph using the new predicted wind data and running a plurality of new simulations;
using the new connection graph to determine a new flight map using the cost function and iterating from the destination cell to a new initial cell;
using the new flight map to determine a new route; and
providing the new route to the actual aircraft.

19. The method of claim 18, further comprising:
after providing the route, receiving an updated current location of the actual aircraft; and
determining the new initial cell based on the current location.

20. The method of claim 1, further comprising generating seed connection data for a time beyond the period of time into the future, and wherein determining the flight map is further based on the seed connection data.

21. The method of claim 20, wherein generating the seed connection data includes determining average transit times between cells of the grid using historical wind data including connection data for a plurality of slice periods.

22. The method of claim 21, wherein generating the seed connection data includes determining an average value for each cell of the grid using the average transit times.

23. The method of claim 21, wherein generating the seed connection data includes comparing wind data for a given slice period of the connection graph to the historical wind data to identify a predetermined number of slice periods of the plurality of slice periods of the historical wind data.

24. The method of claim 23, wherein the given slice period is a first slice period in time for the connection graph.

25. The method of claim 23, wherein generating the seed connection data includes, for each of the predetermined number of slice periods, identifying a slice period of the historical wind data based on a period of the connection graph.

26. The method of claim 25, wherein generating the seed connection data includes, for a given cell of the grid, taking an average of any identified slice periods.

27. The method of claim 20 wherein generating the seed connection data includes determining average transit times between cells of the grid over a predetermined period of time using historical wind data including connection data for a plurality of slice periods.

28. The method of claim 27, further comprising, determining the predetermined period of time based on a calendar month for a first slice period in time for the connection graph.

29. The method of claim 20, further comprising comparing wind data for a first slice period in time to a plurality of clusters of historical wind data in order to identify a cluster of the clusters, and the seed connection data is generated based on the identified cluster.

* * * * *